(12) United States Patent
Noble et al.

(10) Patent No.: US 6,880,662 B2
(45) Date of Patent: Apr. 19, 2005

(54) MOTORIZED CYCLE

(76) Inventors: Eric Noble, C/O The Carlab, 217 E. Chapman, Orange, CA (US) 92866; Brian Booth, 628 Watkins, Birmingham, MI (US) 48009

( * ) Notice: Subject to any disclaimer, the term of this patent is extended or adjusted under 35 U.S.C. 154(b) by 0 days.

(21) Appl. No.: 10/629,218

(22) Filed: Jul. 29, 2003

(65) Prior Publication Data

US 2005/0023061 A1    Feb. 3, 2005

(51) Int. Cl.[7] ............................................. B62D 61/02
(52) U.S. Cl. ...................... 180/219; 180/908; 180/403
(58) Field of Search ................................ 180/218–220, 180/227, 231, 208, 908, 403; 280/278, 287

(56) References Cited

U.S. PATENT DOCUMENTS

| | | | |
|---|---|---|---|
| 378,253 A * | 2/1888 | Latta | 280/270 |
| 3,937,291 A * | 2/1976 | Hanagan | 180/220 |
| 4,265,329 A * | 5/1981 | de Cortanze | 180/219 |
| 4,579,190 A * | 4/1986 | Hashimoto et al. | 180/227 |
| 4,718,688 A * | 1/1988 | Sanders | 280/278 |
| 4,744,579 A * | 5/1988 | Roatta | 280/275 |
| 4,813,511 A * | 3/1989 | Yamaguchi et al. | 180/219 |
| 6,270,103 B1 * | 8/2001 | Grimm | 280/270 |
| 6,588,787 B1 * | 7/2003 | Ou | 280/287 |
| 6,685,282 B1 * | 2/2004 | Sakamoto | 303/170 |
| 6,719,081 B1 * | 4/2004 | Liao et al. | 180/220 |

OTHER PUBLICATIONS

Preston Lerner, Full Tilt Boogie Machine, Popular Science, Nov. 2002, p. 52.

* cited by examiner

*Primary Examiner*—Avraham Lerner
(74) *Attorney, Agent, or Firm*—Stetina Brunda Garred & Brucker

(57) ABSTRACT

A motorized cycle having a frame/chassis supporting a seat and handle grips, on one hand, and front and rear wheels, on the other hand, via a single, vertically-extending frame portion extending therebetween. Such frame/chassis defines voids in the front and rear of the motorized cycle and is further preferably configured such that the height of the seat and handle grips can be selectively adjusted. The motorized cycle otherwise utilizes conventional motorcycle/scooter parts and accessories. The motorized cycle may be adapted for on roan or off-road use, as may be desired.

12 Claims, 3 Drawing Sheets

MOTORIZED CYCLE

CROSS-REFERENCE TO RELATED APPLICATIONS

Not Applicable

STATEMENT RE: FEDERALLY SPONSORED RESEARCH/DEVELOPMENT

Not Applicable

BACKGROUND OF THE INVENTION

The present invention is directed to motorized cycles having a frame design that is substantially more space efficient, is more aesthetically pleasing, and optimally positions a rider thereon to better enable the rider to control the vehicle than prior art motor-driven cycles and the like.

In this regard, motorcycles, scooters, and other motor-driven cycles are well-known in the art. Such motor-driven cycles are mass produced in a variety of configurations depending on their intended use, whether it be for a larger or smaller rider, on or off road use, street or freeway driving, and the like. Exemplary of, and perhaps most well-known of such motorized-cycle manufacturers include Harley Davidson USA; Honda Motor Corporation of Japan, Yamaha Motor Corporation, BMW, Kawasaki and Suzuki.

With respect to scooters, mini-bikes and other motor-driven cycles having a generally smaller engine size, the same are particularly advantageous insofar as such vehicles consume minimal fuel (particularly when compared to automobiles), are generally inexpensive, smaller in size, generally easy to operate, and possess a high degree of maneuverability. Despite such advantages, however, such class of motor-driven cycle suffer from the drawback of utilizing conventional motorcycle frame construction. As is well-known to those skilled in the art, conventional motorcycle-type frames or chassis, similar to bicycle frames, are configured to have front and back ends that distribute the weight of the cycle between the front and rear tires and accommodate the rider therebetween. With respect to the front end, the same typically includes a steering handle set and forks, the latter extending toward and engaging the front tire. Such conventional frame design further includes rearwardly-extending frame portions operative to engage and selectively position rear tire. With respect to the latter, it is well-known in the art to incorporate a suspension, such as a swing arm coupled to a shock absorber to help facilitate the ability of the rear tire to be driven and maintain contact with the ground as the same is driven, typically by a chain drive. In this respect, suspension systems are integrated as part of such frame or chassis to keep the front and back wheels on the ground in the face of uneven pavement and higher speeds. Moreover, there is typically thrust within the frame between the front and rear tires the engine, and frequently the fuel tank as well Such conventional motorcycle frame or chassis design suffers from several well-known disadvantages. First of all, because the frame or chassis generally extends along the length of the wheel base, there is not clearly defined a vertical axis about which the angular motion of the motorcycle is determined. In this regard, it is well-known to those skilled in the art that such vertical axis defines the movement when the motorcycle steers around a bend. Generally, the longer the wheel base, the more difficult it is for the rider to predict and approximate the steering necessary to effectively maneuver the vehicle.

In addition, because of the inflexible construction of virtually all motorcycle frames and chassis in production, there is typically no easy and effective way to make vertical adjustments of the seating and steering mechanisms of such motorcycles, and in particular smaller motor-driven cycles such as scooters and the like. As a consequence, virtually all motor-driven cycles in production are virtually static with regard to their ability to adjust the size to fit a particular rider, particularly with respect to the height of the rider.

Still further, conventional motorcycle and scooter frame/chassis design is spatially inefficient. In this regard, as discussed above, the frame/chassis design typically extends across and about the entire length between the front and rear tires and extends upwardly therefrom in a generally vertical manner, thus consuming large volumes of space. A substantial amount of volume is particularly consumed due to conventional forked front-end frame suspension systems.

A yet further drawback to conventional motorcycle frame/chassis design, particularly with respect to the design typically utilized in scooters and mini-bikes, is the seating integrated as part of such frame. In this regard, most smaller engine-driven cycles are typically configured to place the rider in an upright seated position such that the back of the rider is maintained in a generally perpendicular orientation relative the ground. Larger, higher performance motorcycles, however, typically position the rider in a forward-leaning position, similar to that assumed when riding a conventional mountain bike. As is well-known, the ability to maneuver a cycle, particularly with regard to the ability of the rider to shift his or her weight as is necessary to make turns, is enhanced when the rider is positioned to lean slightly forward while riding.

Due to such shortcomings, there is a substantial need in the art for a motor-driven cycle that utilizes a novel frame/chassis design whereby such frame/chassis extends along a single vertical axis. There is additionally a need in the art for such a motorized cycle that enables the same to be selectively adjustable along such vertical axis such that the height of the motorized cycle can quickly, easily and accurately be adjusted to fit the dimensions of a particular rider. Still further, there is a need in the art for such a motorized cycle that is spatially efficient and that substantially conserves space, especially with regard to the front and rear portions of such cycle, typically occupied by conventional frame construction, that enables the cycle to function, be transported and stored in a substantially more space-efficient manner than prior art motor-driven cycles and the like. In addition to the foregoing needs, there is yet further a need for such a cycle that is of simple construction, relatively low cost, can be readily manufactured utilizing existing componentry and is easier to operate than prior art cycles.

BRIEF SUMMARY OF THE INVENTION

The present invention specifically addresses and alleviates the above-identified deficiencies in the art. In this regard, the present invention is directed to a motorized cycle having a frame/chassis design that utilizes a single, vertically-extending frame portion that connects the seat and handle grips with the front and rear wheels of the cycle. The use of such frame, which preferably has a generally "X-type" configuration, defines voids in the front and rear of the cycle to thus enable the same to assume a space-efficient configuration. The motorized cycle is further configured, in a preferred embodiment, to enable the seat and handle grips to be vertically adjusted, and further preferably enables the seat to be configured such that the rider can assume a forward-leaning configuration that approximates the positioning of a rider on a conventional mountain bike. With respect to the componentry and engine parts, the same preferably comprise conventional parts, engines and other components, that are commercially available. However, in order to achieve a space-efficient design, the motorized cycle of the present invention relies upon a hydraulic front steering mechanism to thus eliminate conventional motorcycle steering mechanisms (i.e., head set and fork design). It is additionally contemplated that in order to further conserve space that the motorized cycle will have a smaller engine size, such as a 50 cc engine, and utilize conventional scooter wheels that will preferably have a diameter of approximately ten inches or less.

In further refinements, it is contemplated that the motorized cycle of the present invention may be modified, as per conventional motorcycles and the like, to be adapted and configured for use in either on road or off road use and include additional safety features, have an increased engine size, or otherwise adapted for any specific type of use. To achieve that end, it is contemplated that all existing conventional parts, accessories, and technology may be incorporated for use in the motorized cycles of the present invention.

BRIEF DESCRIPTION OF THE DRAWINGS

These as well as other features of the present invention will become more apparent upon reference to the drawings.

DETAILED DESCRIPTION OF THE INVENTION

The detailed description set forth below is intended as a description of the presently preferred embodiment of the invention, and is not intended to represent the only form in which the present invention may be constructed or utilized. The description sets forth the functions and sequences of steps for constructing and operating the invention. It is to be understood, however, that the same or equivalent functions and sequences may be accomplished by different embodiments and that they are also intended to be encompassed within the scope of the invention.

Figure 1:
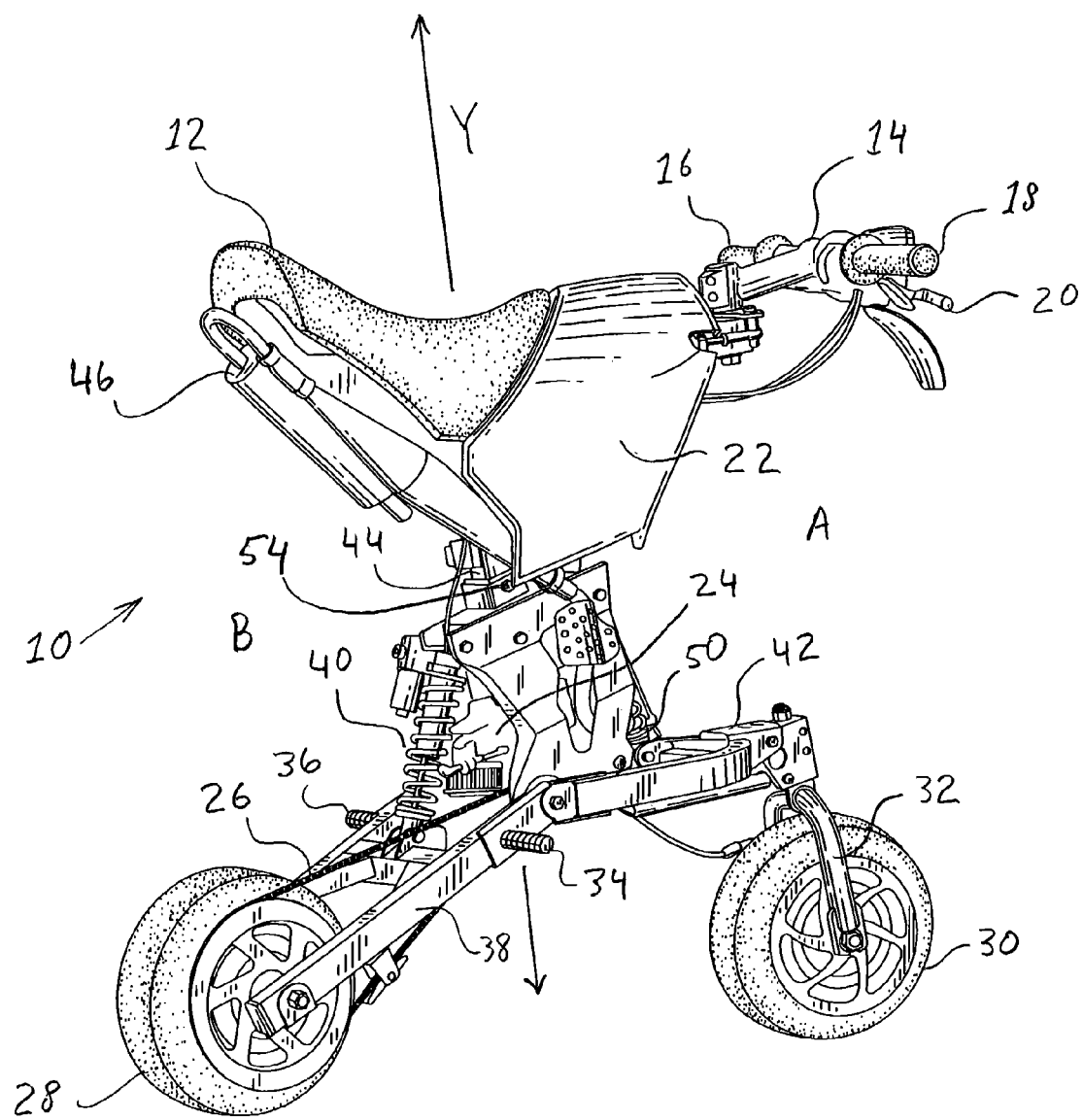
FIG. 1 is a perspective view of a motorized cycle constructed in accordance with the preferred embodiment of the present invention.
Figure 2:
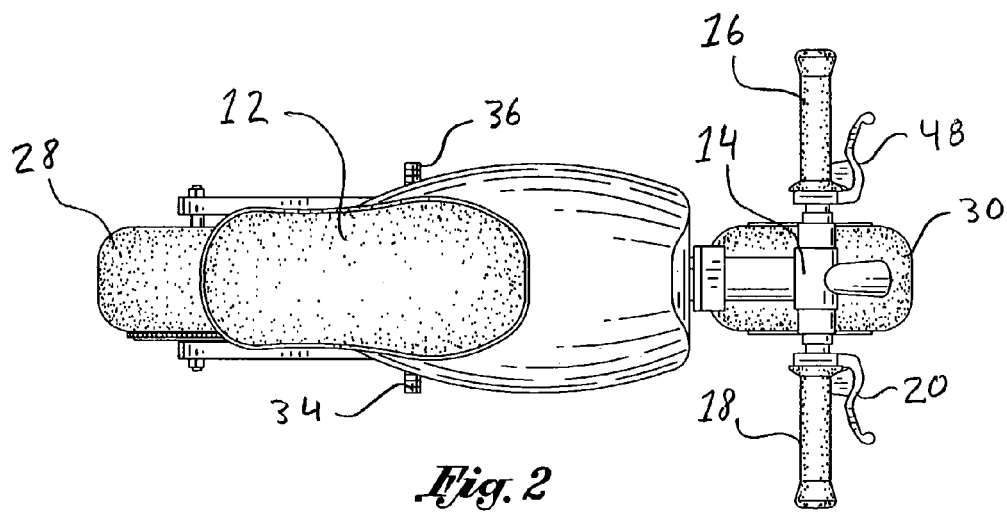
FIG. 2 is a top view of the motorized cycle depicted in FIG. 1.

Referring now to the drawings, and initially to FIG. 1, there is shown a motorized cycle 10 constructed in accordance with a preferred embodiment of the present invention. As illustrated, and as per conventional motorcycles wellknown in the art, the motorized cycle 10 is provided with an upper frame portion supporting a seat 12 and handle set 14, the latter having grips 16 and 18 for receiving the respective hands of a rider and providing throttle control. Additionally provided are handles, such as 20 (as well as 48 as depicted in FIG. 2) which are operative to function in a conventional manner, such as to impart a slowing or stopping force to the front and rear wheels 28, 20 or serve as a clutch.

The motorized cycle further includes a body portion 22, which may be designed and configured as per conventional motorized cycles to store a fuel tank and the like. There is further provided an engine 24, which may be either battery powered or gas powered, as shown, disposed centrally within the motorized cycle. Per conventional motorcycles, such engine 24 drives a (chain drive 26, the latter being operative to impart a driving force to rear wheel 28. An exhaust system 46, coupled to engine 24, disposed beneath seat 12 is also provided per conventional construction.

The frame or chassis of the motorized cycle 10 of the present invention, which is discussed in detail below, further comprises a lower portion consisting of rear frame portion 38 that is preferably coupled to shock absorber 40 that, as per conventional motorcycle design, is operative to absorb shock and ensure tire contact with the road when rough or uneven pavement is encountered. Such frame portion 38 further preferably has formed thereon footrest receiving members 34, 36 that are operative to provide support to the rider's feet respectively, when riding the motorized cycle. A front frame portion 42 is further provided as part of the lower frame portion that is pivotally coupled to rear frame portion 38 and further includes a miniaturized fork system 32 operative to receive and hold front wheel 30. Such front frame portion 42 is further coupled to a shock absorber 50, also more clearly seen in FIG. 3, to thus absorb shock encountered while riding.

Importantly, and unlike conventional motorcycle frames, chassis and the like, the motorized cycle 10 of the present invention further includes a single upwardly extending frame portion 44 that extends along a single vertical axis Y intermediate the upper and lower frame portions. As a consequence, there is advantageously eliminated the spatially inefficient use of elongate forks and rear motorcycle framing portions that take up considerable space and make for an unnecessarily large vehicle. The frame design of the present invention, in contrast to prior art frame/chassis construction, defines two open areas or voids, A and B, with void A being defined in the front portion of the motorcycle and void B being defined in the rear portion of the vehicle. Unlike any prior art motorcycle, scooter or other motor driven cycle, the motorized cycle of the present invention, due to its unique frame/chassis design that defines voids A, B, creates a far more spatially efficient vehicle that is more easily transported and further facilitates the ability of a rider to drive the motorized cycle 10, discussed more fully below. In a preferred embodiment, and as further discussed more fully below, such upwardly extending frame portion 44 may further be selectively adjusted via adjustment bolt 54 to thus enable the height of the seat 12 and handle set 14 to be selectively adjusted, as may be desired to accommodate riders of dissimilar size.

Figure 3:
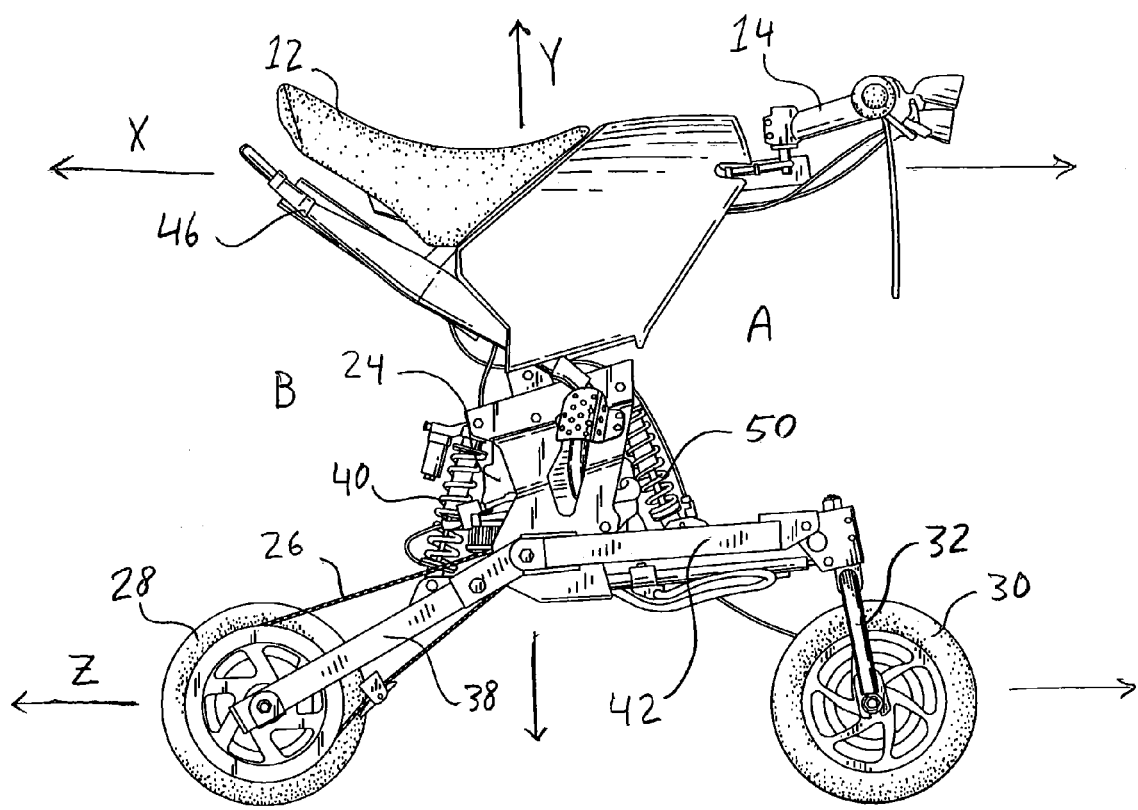
FIG. 3 is a side view of the motorized cycle depicted in FIG. 1.

As more clearly illustrated in FIGS. 2 and 3, motorized cycle 10 of the present invention may further preferably be configured such that the seat 12 and handle set 14 thereof, are maintained at approximately the same height, and are further configured to extend generally along horizontal axis X. Although a variety of alternative configurations may be utilized such that seat 12 may be lower than handle set 14, which is typical of prior art scooter designs and the like, it is believed that by maintaining seat 12 and handle set 14 along such horizontal axis will better position the rider riding the motorized cycle 10 of the present invention by thus placing the rider in a forward-leaning manner. As is well-known, such forward-leaning position, which is typically assumed by riders of high performance motorcycles and conventional mountain bikes, better distributes the weight of the rider about the cycle and thus gives the rider greater control with respect to the maneuvering and handling of the cycle. Insofar as it is contemplated that the motorized cycle 10 of the present invention will be particularly well suited for use with smaller engines, such as 50 cc engines, the motorized cycle 10 of the present invention will advantageously allow riders to assume such forward-leaning position on such a smaller engine-driven cycle that has not heretofore been available. As discussed above, most smaller engine-driven cycles, and in particular scooters, are configured such that the rider maintains an upwardly seated position that does not readily allow the rider to easily shift his or her weight as is necessary to make turns and the like.

In order to further help conserve space, and thus define the voids A, B, it is preferred that the lower portion of the cycle, and in particular wheels 28, 30 thereof, will be sized and constructed in as space efficient manner as is possible. In the embodiment shown, wheels 28, 30 will preferably have a smaller diameter, and will preferably utilize conventional ten-inch scooter wheels well-known to those skilled in the art. Moreover, and as better illustrated in FIG. 3, such wheels 28, 30 will extend along a second horizontal axis Z, the latter of which extending in generally parallel relation to upper axis X.

In addition to the use of smaller wheels and tires, the motorized cycle 10 of the present invention will further preferably incorporate the use of front and rear hydraulic brakes, which are well-known to those skilled in the art and may take any of those that are commercially available. Likewise, the steering mechanism will preferably utilize conventional hydraulic steering systems well-known in the art and commercially available. With respect to the latter, it is contemplated that the use of such hydraulic system will thus help conserve space, and in particular increase the size of void A defined by the front portion of the cycle insofar as such hydraulic steering will eliminate the need for forks that typically extend from the handle set 14 directly to front wheel 30.

With respect to lower frame portion, and in particular front and rear portions 38, 42, it will be readily appreciated by those skilled in the art that the same may take any of a variety of conventional frame designs, and may include swing or rocker arm configurations, as shown. To that end, it is contemplated that such frame portions may be coupled with conventional shock absorbers 40, 50 which also may include any shock absorber mechanism known in the art, both now and as may be later developed.

In all embodiments, however, it should be understood that a single, centrally-disposed and vertically extending frame portion will be provided that extends along a single vertical axis Y that will preferably extend in generally perpendicular relation relative horizontally-extending axes X, Z. As will be appreciated by those skilled in the art, by utilizing a single, centrally-disposed vertically-extending frame portion extending along axis Y, the rider will thus be able to shift and maneuver the cycle 10 with greater ease and accuracy as compared to frame designs extending across the entire length of the cycle.

Figure 4:
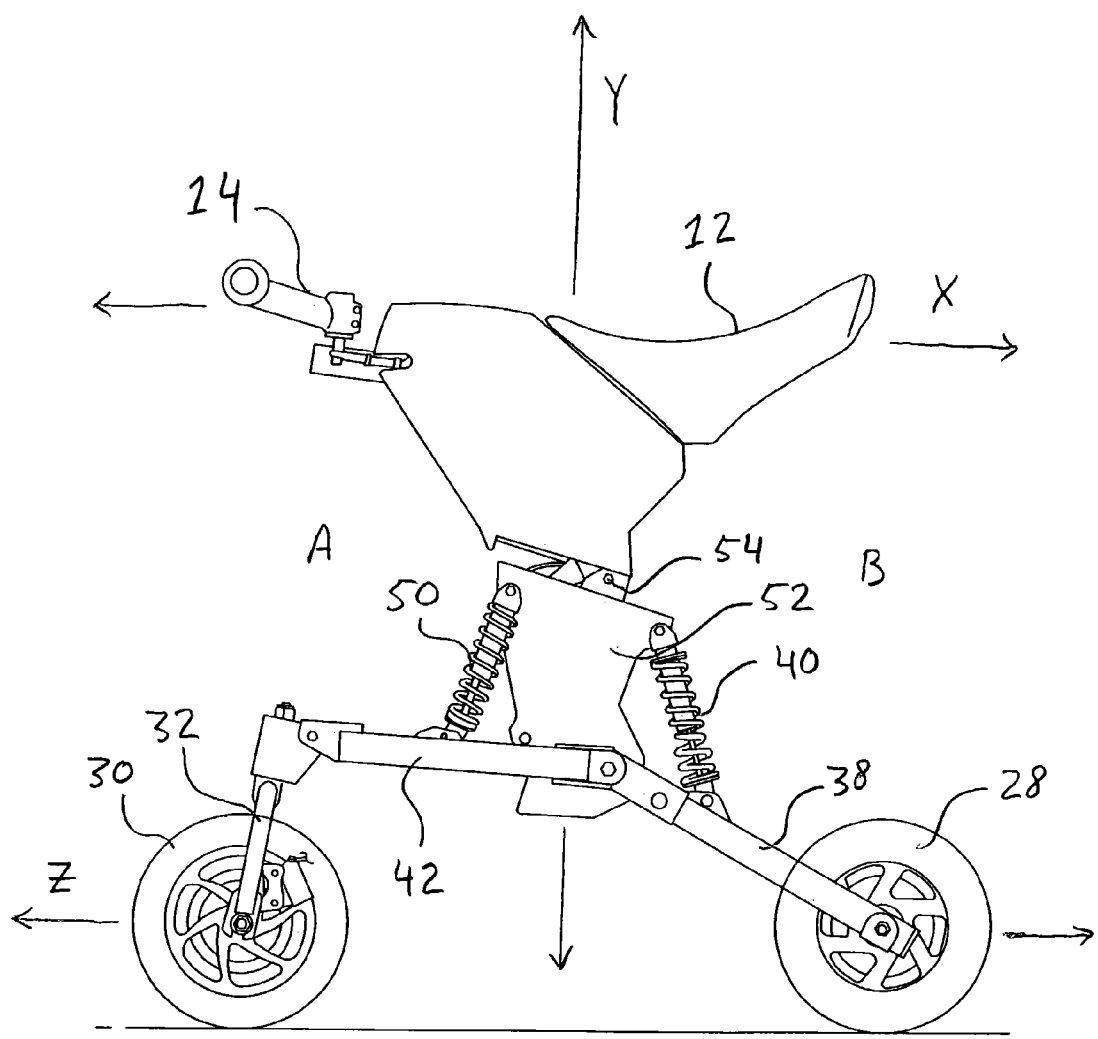
FIG. 4 is a left side view of the chassis of the motorized cycle of the present invention as constructed in accordance with a preferred embodiment.

To better illustrate this concept, there is illustrated in FIG. 4 the general frame portions discussed above. As illustrated, seat portion 12 and handle set 14 are preferably configured to extend along a generally horizontal axis X whereas wheels 28, 30 extend along horizontal axis Z, the latter being supported by frame portion 38, 42 such that the same extend as low to the ground as possible to thus maximize the area of voids A, B defined in the front and rear portions of the cycle. Additional frame portion 52 is coupled to the frame portions 38, 40, as well as shock absorbers 40, 50 extending diagonally therefrom, such that the same extend upwardly about a single axis Y to support the upper portion, namely, seat portion 12 and handle set 14 of the cycle to thus define a generally "X" structure. As will be readily appreciated by those skilled in the art, although depicted utilizing the combination of frame portion 32, 38 with shock absorbers 40, 50 to frame portion 52 and 44 (the latter not shown), it should be readily appreciated by those skilled in the art that numerous alternative configurations will be readily appreciated whereby the upper and lower portions of a motorized cycle may be formed such that the upper portion, defined by the seat portion 12 and handle set 14 extend upwardly along a single frame portion from the front and rear tires of the motorized cycle. In this regard, it is expressly contemplated that the present invention will encompass any such design, and in particular any cycle design utilizing a single, upwardly extending frame portion defining a generally vertical axis, especially a generally vertically-extending axis disposed intermediate the front and rear wheels of such cycle that is disposed intermediate or between such upper and lower portions.

Additional modifications and improvements of the present invention may also be apparent to those of ordinary skill in the art. For example, it is contemplated that the frame of the motor-driven cycle may be provided with heavy-duty shock absorbers, tubing and the like to the extent the same is adapted for off road use. Likewise, it is contemplated that such cycle may be provided with conventional accessories, such as storage compartments, back rests, light fixtures, or other well-known options known in the art known to enhance the safety and performance of such cycle as per conventional motor-driven cycles. Thus, the particular combination of parts and steps described and illustrated herein is intended to represent only certain embodiments of the present invention, and is not intended to serve as limitations of alternative devices and methods within the spirit and scope of the invention.

What is claimed is:

1. A motorized cycle having a frame, said frame having a first upper portion supporting a seat and handle set, and a second lower portion supporting front and rear wheels of such motor-driven cycle, said frame further including a generally vertical, intermediate frame portion disposed between and interconnecting said upper and lower frame portions and extending upwardly from said lower frame portion at a point between said front and rear wheels such that a first void is defined between the front wheel and handle set of said motorized cycle and a second void is defined between said rear wheel and said seat of said motorized cycle, said first void having a length equal to or greater than the diameter of said front wheel and said second void having a length equal to or greater than the diameter of said rear wheel.

2. The motorized cycle of claim 1 wherein said handle set and said seat of said motorized cycle are disposed along a first generally horizontal axis.

3. The motorized cycle of claim 2 wherein said front and rear wheels are disposed along a second generally horizontal axis, said second horizontal axis and said first horizontal axes being substantially parallel.

4. The motorized cycle of claim 3 wherein said intermediate frame portion extends along a vertical axis that is substantially perpendicular relative said first and second horizontal axes.

5. The motorized cycle of claim 4 wherein said motorized cycle further includes at least one hydraulic brake.

6. The motorized cycle of claim 5 wherein said motorized cycle utilizes front and rear hydraulic brakes.

7. The motorized cycle of claim 4 wherein said motorized cycle incorporates the use of hydraulic steering.

8. The motorized cycle of claim 4 wherein said lower frame portion is comprised of a front frame portion coupled to said front wheel of said motorized cycle and a rear frame portion coupled to said rear wheel of said motorized cycle, said front and rear frame portions further having dedicated shock absorbers mounted thereon for engaging with said intermediate frame portion.

9. The motorized cycle of claim 4 wherein said cycle is powered by a gas engine.

10. The motorized cycle of claim 4 wherein said cycle is powered by an electric motor.

11. The motorized cycle of claim 9 wherein said gas engine comprises a 50 cc engine.

12. The motorized cycle of claim 4 wherein said front and rear wheels have a diameter or ten inches or less.

* * * * *